United States Patent

Hagiwara

[11] Patent Number: 5,616,096
[45] Date of Patent: Apr. 1, 1997

[54] DIFFERENTIAL GEAR UNIT

[75] Inventor: Makoto Hagiwara, Tochigi, Japan

[73] Assignee: Viscodrive Japan Ltd., Tochigi, Japan

[21] Appl. No.: 516,146

[22] Filed: Aug. 17, 1995

[30] Foreign Application Priority Data

Aug. 18, 1994 [JP] Japan .................................. 6-194362

[51] Int. Cl.$^6$ ........................................................ F16H 1/42
[52] U.S. Cl. ........................................................ 475/249
[58] Field of Search .................................. 475/249, 252

[56] References Cited

U.S. PATENT DOCUMENTS

| | | | |
|---|---|---|---|
| 3,375,735 | 4/1968 | Saari | 475/249 |
| 3,375,736 | 4/1968 | Saari | 475/249 |
| 4,012,968 | 3/1977 | Kelbel . | |
| 4,041,804 | 8/1977 | Clark | 475/249 |
| 4,058,027 | 11/1977 | Webb . | |
| 4,224,838 | 9/1980 | Roushdy et al. . | |
| 4,836,051 | 6/1989 | Guimbretiere . | |
| 4,905,808 | 3/1990 | Tomita et al. . | |
| 4,966,268 | 10/1990 | Asano et al. . | |
| 4,982,808 | 1/1991 | Taureg et al. . | |
| 5,007,515 | 4/1991 | Shimizu . | |
| 5,007,885 | 4/1991 | Yamamoto et al. . | |
| 5,012,908 | 5/1991 | Kobayashi et al. . | |
| 5,031,743 | 7/1991 | Morishita et al. . | |
| 5,036,963 | 8/1991 | Murata . | |
| 5,056,640 | 10/1991 | Yamamoto . | |
| 5,063,738 | 11/1991 | Asano et al. . | |
| 5,066,268 | 11/1991 | Kobayashi | 475/249 |
| 5,070,975 | 12/1991 | Tanaka et al. . | |
| 5,080,187 | 1/1992 | Asano et al. . | |
| 5,127,503 | 7/1992 | Gratzer . | |
| 5,129,870 | 7/1992 | Pierce . | |
| 5,178,249 | 1/1993 | Haga et al. . | |
| 5,197,583 | 3/1993 | Sakai et al. . | |
| 5,259,488 | 11/1993 | Oberdorster et al. . | |
| 5,261,862 | 11/1993 | Pierce . | |
| 5,267,916 | 12/1993 | Beim et al. . | |
| 5,320,586 | 6/1994 | Baxter, Jr. | 475/249 |
| 5,458,547 | 10/1995 | Teraoka et al. | 475/249 |

FOREIGN PATENT DOCUMENTS

| | | |
|---|---|---|
| 0247008 | 5/1987 | European Pat. Off. . |
| 0347165 | 6/1989 | European Pat. Off. . |
| 480175 | 9/1991 | European Pat. Off. . |
| 0549828 | 12/1991 | European Pat. Off. . |
| 0639730 | 8/1994 | European Pat. Off. . |
| 938813 | 7/1949 | Germany . |
| 4103054 | 8/1991 | Germany . |
| 4032245 | 3/1992 | Germany . |
| 6487928 | 4/1989 | Japan . |
| 1126440 | 5/1989 | Japan . |
| 1220728 | 9/1989 | Japan . |
| 251626 | 2/1990 | Japan . |
| 2120529 | 5/1990 | Japan . |
| 2120530 | 5/1990 | Japan . |
| 337455 | 2/1991 | Japan . |
| 369829 | 3/1991 | Japan . |
| 2202602 | 9/1988 | United Kingdom . |
| 2222232 | 2/1990 | United Kingdom . |

*Primary Examiner*—Dirk Wright
*Attorney, Agent, or Firm*—Dinnin & Dunn, P.C.

[57] ABSTRACT

Arranged within a differential gear case are first and second side gears rotating together with first and second output shafts, respectively; first and second differential gears engaged with one of the first and second side gears and rotatably supported within cylindrical holes, respectively, so as to be partially engaged with each other to move circularly together with the differential gear case; and a viscous coupling capable of transmitting, between a hub rotating together with the output shaft and a housing, a torque in response to the difference in the speed. The outer periphery of the housing is provided with a cam surface to be engaged, in the direction of rotation, with the first and second differential gears to press and bias the first and second differential gears against the inner cylindrical surfaces of the cylindrical holes.

5 Claims, 4 Drawing Sheets

DIFFERENTIAL GEAR UNIT

BACKGROUND OF THE INVENTION

The present invention relates generally to a differential gear unit for use in the middle of a power transmission path for rotationally driving the wheels of motor vehicles and, more particularly, to a differential gear unit fitted with a limited slip differential (LSD) for limiting the differential when a difference in the rotational speed occurs between a pair of output shafts provided in the differential gear unit.

In order to absorb a difference in the rotational speed between inside and outside wheels which inevitably takes place when automobiles turn, for example, a differential gear unit is conventionally disposed in the middle of a power transmission path. However, the typical differential gear unit involves a deficiency that once either a right or left drive wheel sticks in the mud or runs onto ice and snow on the surface of a road it starts to spin, the driving power is not to be transmitted to the drive wheel.

Thus, much use has been recently made of differential gear units equipped with a torque sensitive type limited slip differential for limiting the differential of the differential gear unit when a large difference arises in the driving torque between the right and left drive wheels, or with a speed sensitive type limited slip differential for limiting the differential of the differential gear unit in proportion to the difference in the rotational speed between the right and left drive wheels.

Among the differential gear units equipped with a torque sensitive type limited slip differential superior in operative response to and having a larger transmission driving force than the speed sensitive type, is a differential gear unit generally called a helical LSD or QUAIFE differential.

Figure 4:
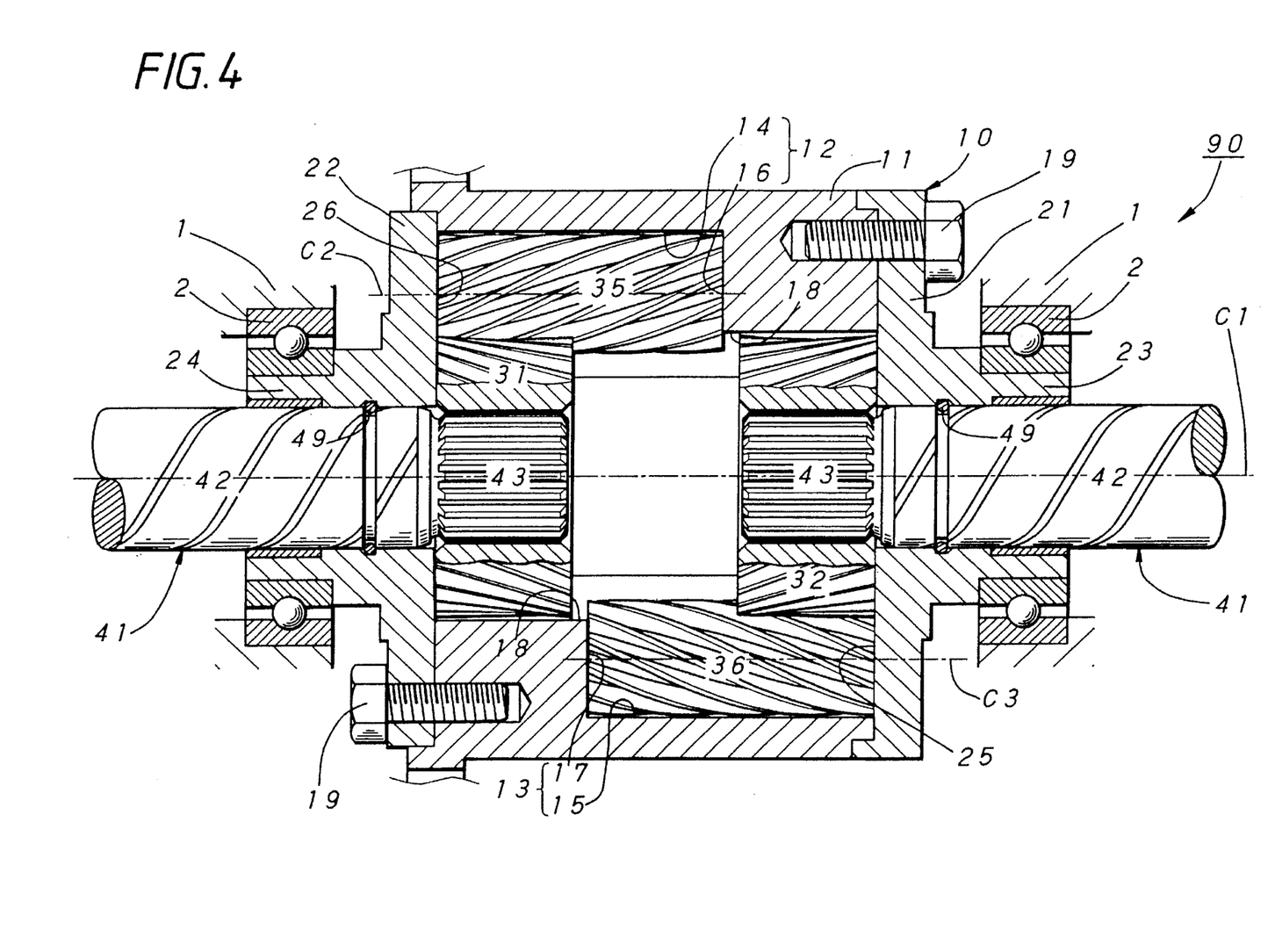
FIG. 4 is a general longitudinal sectional view of a conventional differential gear unit.

Description will be given of the differential gear unit of this type with reference to the accompanying drawings. Referring first to FIG. 4, a differential gear unit generally designated at 90 comprises a differential gear case 10, first and second side gears 31 and 32 serving as driven gears composed of large-diameter helical gears, first and second differential gears 35 and 36 composed of small-diameter helical gears, and a pair of output shafts 41.

The differential gear case 10 includes a substantially cylindrical body 11, and first and second closures 21 and 22 screwed with bolts 19 to the body 11 to close the openings at the ends thereof. The first and second closures 21 and 22 have substantially cylindrical bosses 23 and 24, respectively, integrally formed therewith. The bosses 23 and 24 are fitted into a bearing 2 supported by a differential gear carrier 1, the differential gear case 10 being rotatable on an axis C1.

Thus, the differential gear case 10 is rotated around the axis C1 when a rotational driving force from the engine is transmitted to a drive gear not shown secured to the differential gear case 10. The pair of output shafts 41 are rotatably supported around the axis C1 with their respective stems 42 being internally fitted into the bosses 23 and 24, respectively, and prevented from disengaging from the bosses 23 and 24 by means of circlips 49.

The first and second side gears 31 and 32 are carried within cylindrical openings 27 and 28, respectively, formed at the ends of the differential gear case 10 and are engaged with splined portions 43 of the pair of output shafts 41 so as to be also integrally rotated around the axis C1.

Figure 5:
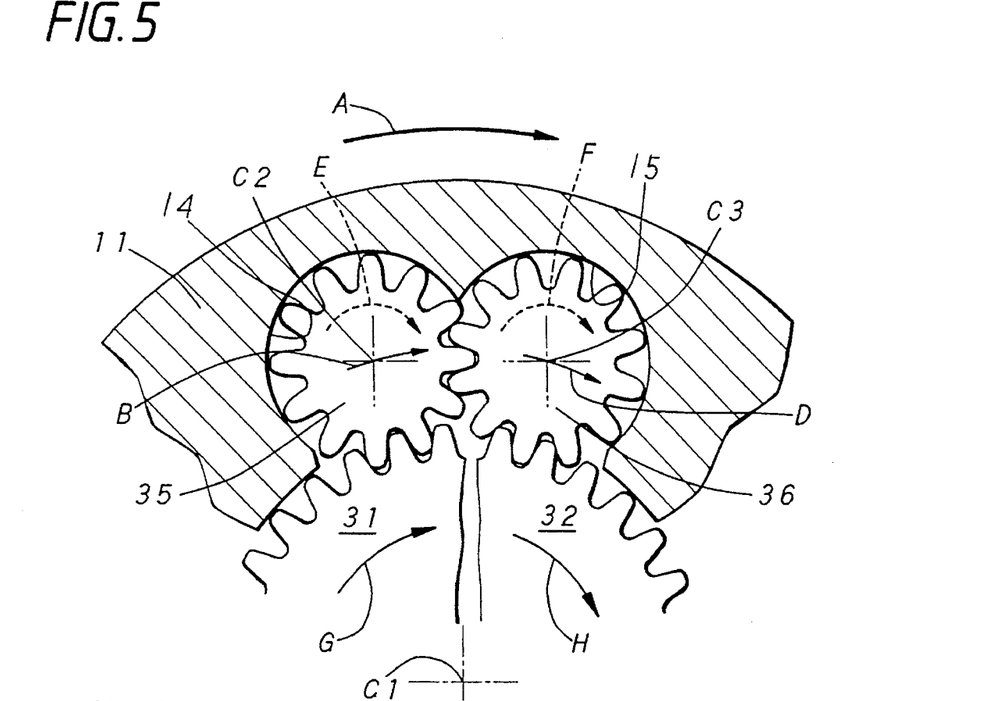
FIG. 5 is an enlarged cross-sectional view of a major part for explaining the operation of the differential gear unit shown in FIG. 4.
Figure 6:
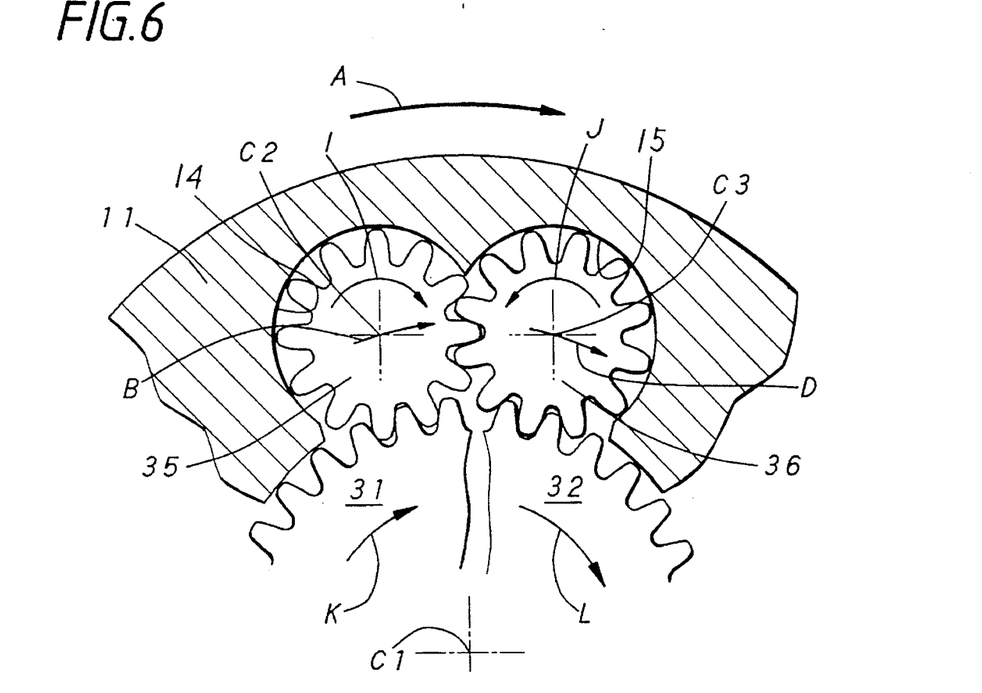
FIG. 6 is another enlarged cross-sectional view of the major part for explaining the operation, of the differential gear unit shown in FIG. 4.

As is seen in FIGS. 4 to 6, the cylindrical body 11 of the differential gear case 10 is provided three sets of first and second cylindrical holes 12 and 13 which are accommodation sections for carrying the differential gears, each set being circumferentially equally spaced in a partially confronting manner, the holes 12 and 13 including axes C2 and C3, respectively, extending parallel to the axis C1 and equidistant from the axis C1. The internal diameters of the cylindrical holes 12 and 13 are slightly larger than the external diameters of the first and second differential gears 35 and 36, respectively, so that the first and second differential gears 35 and 36 carried within the first and second cylindrical holes 12 and 13 are supported rotatably around the axes C2 and C3, respectively.

The first and second differential gears 35 and 36 are partially meshed with each other and, as shown in FIGS. 5 and 6, their outer peripheral surfaces are partially exposed to the cylindrical openings 27 and 28, respectively, to allow the engagements with the first and second side gears 31 and 32.

Referring to FIGS. 5 and 6, the action of the differential gear trait 90 thus constructed will now be explained.

When the differential gear case 10 receives a driving force from the engine, the differential gear case 10 is rotated clockwise around the axis C1 as indicated by an arrow A in FIG. 5. This causes the first and second differential gears 35 and 36 carried within the cylindrical holes 12 and 13 respectively, of the differential gear case 10 to revolve in conjunction with the differential gear case 10 around the axis C1 in the direction indicated by arrows B and D. Since at that time the first and second differential gears 35 and 36 are meshed with the first and second side gears 31 and 32, the first differential gear 35 tries to rotate within the cylindrical hole 12 on the axis C2 in the direction indicated by a dotted arrow E, and in the same manner the second differential gear 36 tries to rotate within the cylindrical hole 13 on the axis C3 in the direction indicated by a dotted arrow F. However, the mutual engagement between the first and second differential gears 35 and 36 will prevent the first and second differential gears 35 and 36 from being independently rotated in the directions indicated by the dotted arrows E and F, respectively.

Thus, the first and second differential gears 35 and 36 revolve around the axis C1 in conjunction with the differential gear case 10 without being rotated on their respective axes C2 and C3, thereby causing the first and second side gears 31 and 32 meshed therewith to drivingly rotate on the axis C1 in the directions indicated by the arrows G and H, respectively.

On the contrary, when the automobile turns, a difference in rotational speed between the right and left drive wheels which is caused by the difference in turning radius between the inside and outside wheels must be absorbed by means of the differential gear unit. To absorb the difference in the rotational speed between the inside and outside wheels, in this instance, the differential gear unit 90 depicted in FIG. 4 is arranged such that the first and second differential gears 35 and 36 revolve around the axis C1 in the clockwise direction indicated by the arrows B and D while rotating on their respective axes C2 and C3 in the directions of the arrows I and J, respectively, as shown in FIG. 6, thereby drivingly rotating the first side gear 31 at a speed obtained by subtracting the amount of rotation of the first differential gear 35 from the number of rotations of the differential gear case 10, and drivingly rotating the second side gear 32 at a speed obtained by adding the amount of rotation of the second differential gear 36 to the number of rotations of the differential gear case 10.

Since this differential gear unit 90 employs the helical gears as the first and second differential gears 35 and 36 and the first and second side gears 31 and 32, the first and second differential gears 35 and 36 are not only biased radially outwardly with respect to the axes C2 and C3, respectively, by the engagement reaction force arising from mutual engagement with the first and second side gears 31 and 32, but also biased axially along the axes C2 and C3, with the result that the first mad second differential gears 35 and 36 are pressed and biased against not only the inner cylindrical surfaces 14 and 15, respectively, of the cylindrical holes 12 and 13, respectively, but also the bottom surfaces 16 and 17, respectively.

In the same manner, the first and second side gears 31 and 32 are thrusted axially along the axis C1 and are pressed and biased against the inner wall surfaces 25 and 26, respectively, of the first and second closures 21 and 22, respectively, of the differential gear case 10.

Accordingly, when either one of the right and left drive wheels sticks in the mud or runs onto ice and snow lying on the surface of the road to start to spin, there occurs a difference in the rotational speed between the first side gear 31 and the second side gear 32, allowing the first and second differential gears 35 and 36 to start to rotate within the cylindrical holes 12 and 13, respectively, of the differential gear case 10. At that time, the first and second differential gears 35 and 36 are thrust radially outwardly with respect to the axes C2 and C3, respectively, by the engagement reaction force arising from the engagement with the first and second side gears 31 and 32, respectively, and are pressed and biased against the inner cylindrical surfaces 14 and 15, respectively, of the cylindrical holes 12 and 13, respectively, of the differential gear case 10, resulting in a frictionally sliding rotation on their respective axes C2 and C3. Similarly, the first and second side gears 31 and 32 are thrusted axially along the axis C1 by the engagement reaction force arising from the engagement with the first and second differential gears 35 and 36, respectively, and are pressed and biased against the inner cylindrical surfaces 25 and 26, respectively, of the closures 21 and 22, respectively, of the differential gear case 10, resulting in a frictionally sliding rotation on the axis C1.

Thus, between the pair of output shafts 41 in this differential gear unit 90 there acts a limited slip differential torque caused both by a frictional resistance between the first and second differential gears 35 and 36 and the inner cylindrical surfaces 14 and 15, respectively, of the differential gear case 10 and by the frictional resistance between the first and second side gears 31 and 32 and the inner wall surfaces 25 and 26, respectively, of the differential gear case 10. This enables a driving force equal to this limited slip differential torque to be transmitted to the drive wheel opposite to the spinning drive wheel, making it possible to escape from the state where the wheel on one side has stuck in the mud or run onto ice and snow.

Nevertheless, in case either one of the right and left t drive wheels (e.g., the left-handed drive wheel in the diagram) has run onto ice of the ultra-low u road or come off to start to spin with substantially zero gripping force, the engagement three is not permitted to act between the first side gear 31 on the spinning wheel side and the first differential gear 35, reducing the transmission torque to zero. As a result of this, the first differential gear 35 is not pressed and biased against the inner cylindrical surface 14 of the differential gear case 10, and likewise the first side gear 31 is not pressed and biased either against the inner wall surface 25 of the differential gear case 10.

In this manner, the above-described differential gear unit 90 entails a problem that a driving force is not to be transmitted to the drive wheel since no limited slip differential torque occurs if the gripping force of the drive wheel on one side with respect to the road surface has thoroughly resulted in zero.

SUMMARY OF THE INVENTION

It is therefore the object of the present invention to overcome the above problems and to provide a differential gear unit including an improved limited slip differential superior in operative response and capable of generating a larger limited slip differential torque even when the output shaft on one side spins and hence its engagement reaction force is not permitted to act thereupon.

The above object of the present invention is accomplished by a differential gear unit comprising a differential gear case rotationally driven on an axis of coaxially extending first and second output shafts; first and second driven gears rotatably received in the differential gear case in such a manner as to be coaxial with the axis, the first and second driven gears being rotated integrally with the first and second output shafts, respectively; first and second differential gears adapted to engage with one of the first and second driven gears and rotatably supported within an accommodation section of the differential gear case so as to be partially engaged with each other, the first and second differential gears circularly moving integrally with the differential gear case; a first transmission member rotatably received in the differential gear case in such a manner as to be coaxial with the axis, the first transmission member having an outer periphery provided with cam means engaged, in the direction of rotation, with the first and second differential gears, the cam means pressing and biasing the first and second differential gears against the inner wall surface of the accommodation section; and a second transmission member being rotated integrally with the second output shaft and arranged relatively rotatably with respective to the first transmission member with the interposition of limited slip differential means tier transmitting a torque in response to a difference in a rotational speed.

As the limited slip differential means for transmitting a torque in proportion to a difference in a rotational speed between the first transmission member and the second transmission member, use can be made of a torque transmission mechanism such as a viscous coupling, a hydraulic coupling unit, a rotary blade coupling, or an orifice coupling unit.

According to the above aspect of the present invention, when the first output shaft and the second output shall are subjected to the same rotation, there takes place no torque transmission between the first transmission member and the second transmission member, so that the first transmission member being engaged via the cam means, in the direction of rotation, with the first and second differential gear rotates integrally with the differential gear case whereas the second transmission member rotates integrally with the second output shaft. As a result of this, the cam means of the first transmission member will not bias the first and second differential gears against the inner wall surface of the accommodation section of the differential gear case.

Once there occurs a difference in a rotational speed between the first and second output shafts to cause the differential gear case and the second output shall to relatively rotate, the limited slip differential means allows between the first and second transmission members a generation of a transmission torque in proportion to the relative difference in a rotational speed between the differential gear case and the second output shall, whereupon the cam means of the first transmission member presses and biases the first and second differential gears against the inner wall surface of the accommodation section, resulting in a generation of a frictional resistance between the first and second differential gears and the differential gear case. Thus, between the first output shaft and the second output shaft, a limited slip differential torque acts which arises both from the frictional resistance between the first and second differential gears and the differential gear case and from the transmission torque induced between the first transmission member and the second transmission member by the limited slip differential means.

This will ensure a generation of a large limited slip differential torque between the first output shaft and the second output shaft even in the case where an engagement reaction force is not permitted to act between the driven gear and the differential gear due to the spinning of one of the output shafts.

BRIEF DESCRIPTION OF THE DRAWINGS

These and other aspects, objects, advantages and features of the present invention will become more apparent from the following detailed description when taken in conjunction with the accompanying drawings, in which.

DETAILED DESCRIPTION OF THE PREFERRED EMBODIMENT(S)

Figure 1:
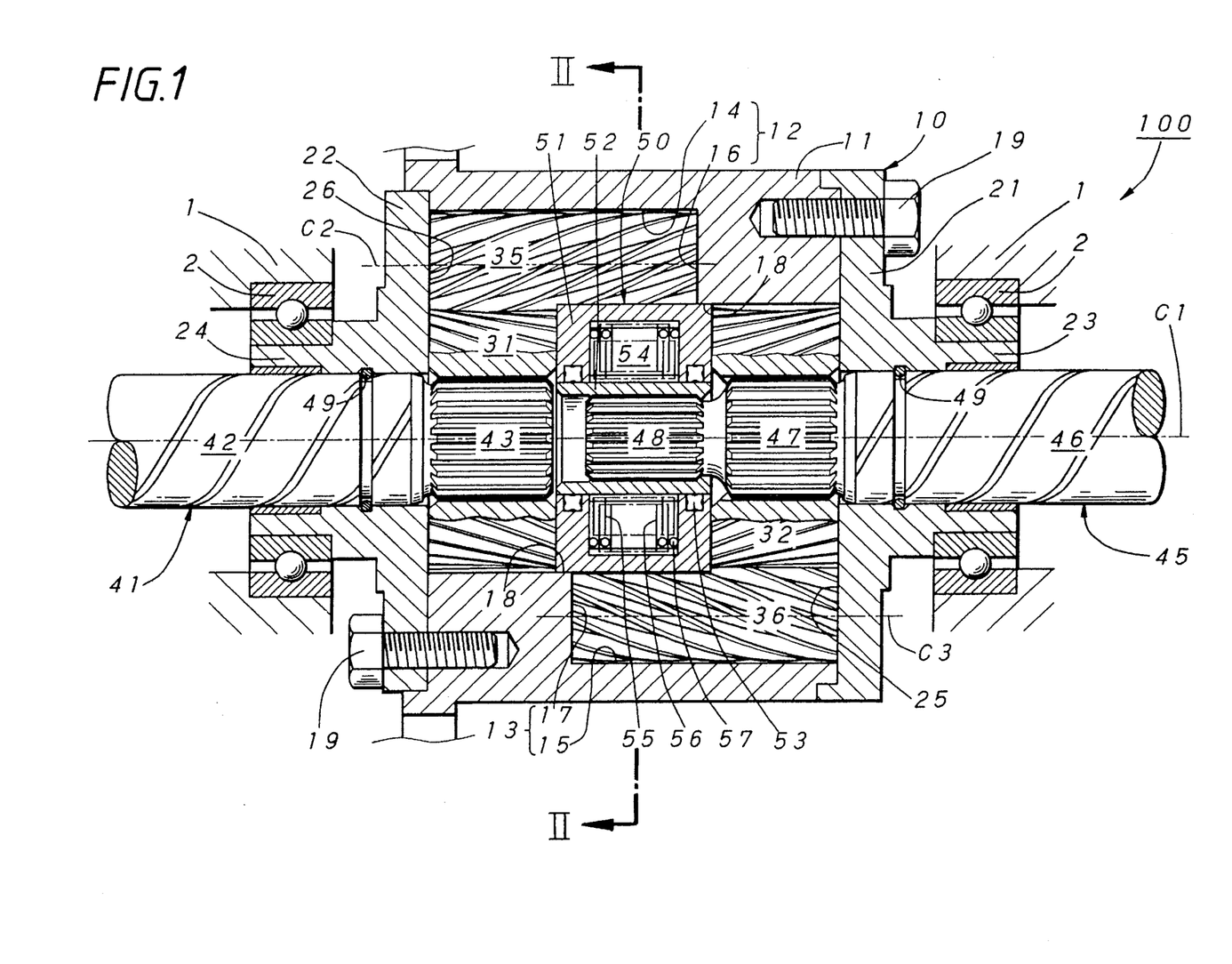
FIG. 1 is a general longitudinal sectional view of a differential gear unit according to an embodiment of the-present invention.
Figure 2:
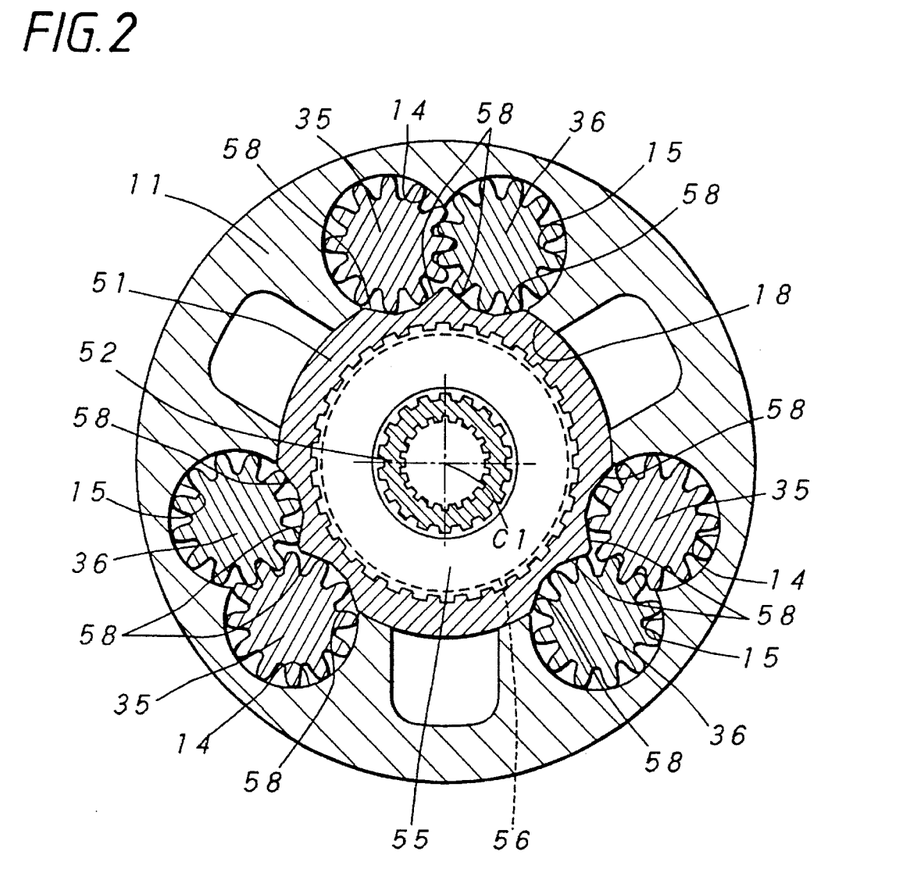
FIG. 2 is a sectional view of the differential gear unit shown in FIG. 1, taken along the line II—II and viewed from the direction of the arrow.
Figure 3:
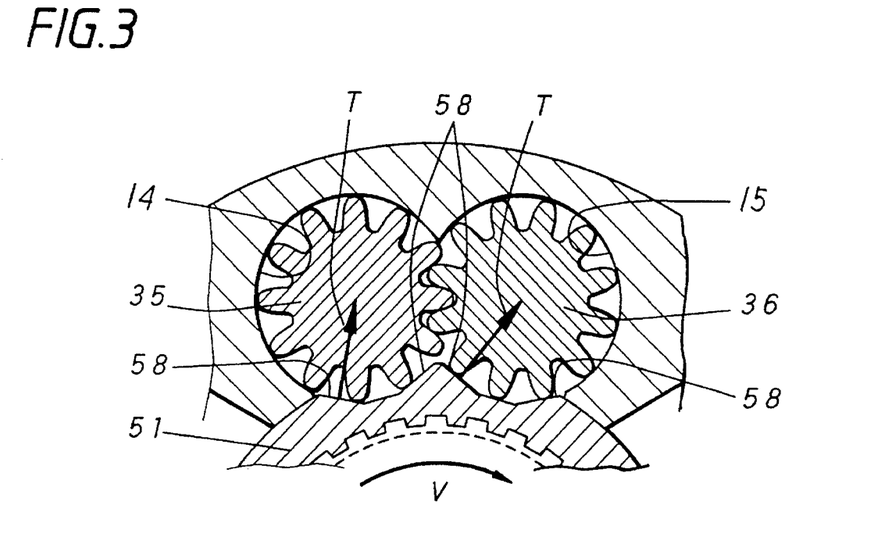
FIG. 3 is an enlarged cross-sectional view of a major part for explaining the operation of the differential gear unit shown in FIG. 1.

An embodiment of a differential gear unit of the present invention will now be described with reference to the invention will now be described with reference to the accompanying drawings. FIG. 1 is a general longitudinal section of the differential gear unit arranged and constructed in accordance with the embodiment of the present invention: FIG. 2 is a sectional view taken along the line II—II and viewed from the direction of the arrow, of the differential gear unit depicted in FIG. 1; and FIG. 3 is an enlarged cross-sectional view of a major part for explaining the operation of the differential gear depicted in FIG. 1. It is to be appreciated that constituent elements identical to those of the conventional differential gear unit 90 depicted in FIG. 1 are given the same reference numerals, and the detailed description thereof will be omitted.

The differential gear unit generally designated at 100 comprises a differential gear case 10, first and second side gears 31 and 32 which are driven gears consisting of large-diameter helical gears, first and second differential gears 35 and 36 consisting of small-diameter helical gears, and first and second output shafts 41 and 45, and a viscous coupling 50 serving as limited slip differential means for torque transmission in response to the difference in a rotational speed.

As is seen in FIGS. 1 and 2, the viscous coupling 50 includes an annular housing 51 with a substantially U-shaped section acting as a first transmission member, and a cylindrical hub 52 which is a second transmission member arranged relatively rotatably with respect to the housing 51, the viscous coupling 50 forming an annular operative chamber 54 sealed in liquid-tight manner by an X-ring 53.

Within the interior of the operative chamber 54 is a plurality of outer plates 56 formed by blanking out a steel sheet into disks, the outer plates being in spline engagement, in the direction of rotation, with the inner periphery of the housing 51 and spaced equally by the spacer rings 57. Within the operative chamber 54 is also a plurality of inner plates 55 formed by likewise blanking out a steel sheet into disks, the inner plates being individually sandwiched by the outer plates 56 and in spline engagement, in the direction of rotation, with the outer periphery of the hub 52. A silicone oil, which is a highly viscous fluid, is further filled within the operative chamber 54.

Thus, a relative rotation of the housing 51 and the hub 52 will allow between the two elements a generation of a limited slip differential torque arising from the viscosity of the silicone oil. The outer cylindrical surface 59 of the housing 51 of the viscous coupling 50 is internally fitted so as to be relatively rotatable into the inner cylindrical surface 18 provided in the cylinder 11 of the differential gear case 10, the housing 51 being rotatably accommodated coaxially with the axis C1 of the first and second output shafts 41 and 45. The outer cylindrical surface 59 is further provided with a cam surface 58 in the form of a pair of grooves extending in the direction of the axis C1, the cam surface 58 serving as cam means adapted to engage, in the direction of rotation, with the first and second differential gears 35 and 36 received in first and second cylindrical holes 12 and 13 which are accommodation section for holding the differential gears, so as to be capable of pressing and biasing the first and second differential gears 35 and 36 against inner cylindrical surfaces 14 and 15 of the cylindrical holes 12 and 13. A small-diameter spline shaft 48 of the second output shaft 45 is fitted into the inner periphery of the hub 52 so that together with the second side gear 32, the hub 52 is rotated integrally with the second output shaft 45.

Description will now be given of an operation characteristic of the differential gear unit of the present embodiment thus constructed. If, for instance, drive wheels rotationally driven by the first and second output shafts 41 and 45, respectively, are subjected to substantially the same rotations, there will arise no difference in rotation between the housing 51 and the hub 52 and hence no torque transmission, with the result that the housing 51 being engaged, in the direction of rotation, via the cam surface 58 with the first and second differential gears 35 and 36 rotates integrally with the differential gear case 10, whereas the hub 52 rotates integrally with the second output shafts 45. Thus, the cam surface 58 of the housing 51 does not press and bias the first and second differential gears 35 and 36 against the inner cylindrical surfaces 14 and 15 of the first and second cylindrical holes 12 and 13 of the differential gear case 10. Accordingly, any limited slip differential force is not exerted on the differential gear unit 100, allowing the first and second output shafts 41 and 45 to be differentially rotated.

Once one of the drive wheels rotationally driven by the first and second output shafts 41 and 45, respectively, sticks in the mud or runs onto ice and snow on the surface of a road and starts to spin, there arises a difference in a rotation speed between the first and second output shafts 41 and 45, allowing a relative rotation between the differential gear case 10 and the output shaft 45. Then the viscous coupling 50 causes, between the housing 51 and the hub 52, a transmission torque in accordance with the difference in the number of relative rotations between the differential gear case 10 and the second output shafts 45, whereupon by its wedge action, the cam surface 58 of the housing 51 rotating in the direction of the arrow V as shown in FIG. 3 will press and bias the first and second differential gears 35 and 36 against the inner cylindrical surfaces 14 and 15 of the first and second cylindrical holes 12 and 13.

The first and second differential gears 35 and 36 which have been pressed and biased, toward the direction of the arrow T, against the inner cylindrical surfaces 14 and 15 of the cylindrical holes 12 and 13 revolve on the respective axes C2 and C3, with their outer peripheries being frictionally sliding on the inner cylindrical surfaces 14 and 15. As a result of this, between the first side gear 31 and the first differential gear 35, and between the second side gear 32 and the second differential gear 36, a transmission of a torque is performed which is equal to the torque enough to rotate the first and second differential gears 35 and 36 against the sliding frictional force with the inner cylindrical surfaces 14 and 15. Thus, between the first output shaft 41 and the second output shaft 42 is induced a limited slip differential torque arising both from a frictional resistance occurring between the first and second differential gears 35,36 and the differential gear case 10, and from a transmission torque generated between the housing 51 and the hub 52 by the viscous coupling 50.

In consequence the differential gear unit 100 of this embodiment will ensure a generation of a large limited slip differential torque between the first output shaft 41 and the second output shaft 45, even in the case where one of the drive wheels loses entirely its gripping force with respect to the surface of the road and hence any engagement reaction force is not permitted to be induced between the first side gear 31 and the first differential gear 35 or between the second side gear 32 and the second differential gear 36.

More specifically, in the differential gear unit 100 of the present invention, the viscous coupling 50 serving as the limited slip differential means is arranged within the interior of the differential gear case 10, and a limited slip differential torque induced in the viscous coupling 50 is used to press and bias the first and second differential gears 35 and 36 against the differential gear case 10 to generate an initial torque, whereby an improved operative response and a reduction in size of the viscous coupling can be achieved as compared with the case, for instance, where the generation of the initial torque at the spinning of the wheel on one side depends exclusively on the viscous torque with mere interposition of the viscous coupling between the first and second output shafts 41 and 45. Thus, without increasing the dimensions of the differential gear unit 100 there can be obtained a good and large limited slip differential.

Although in the differential gear unit 100 of this embodiment the viscous coupling is used as the limited slip differential means for transmitting a torque in response to the difference in a rotational speed between the first and second transmission members, this is not intended to be limitative and it is natural that torque transmission mechanisms can be employed such as, for instance, a hydraulic coupling unit, a rotary blade coupling, and an orifice coupling unit.

According to the differential gear unit of the present invention, a frictional resistance force generated between the first and second differential gears and the inner wall surface of the accommodation section of the differential gear case is allowed to act as the limited slip differential torque between the first and second output shafts, by arranging within the interior of the differential gear case the limited slip differential means for transmitting a torque in response to the difference in a rotational speed between the first transmission member and the second transmission member and by pressing and biasing the first and second differential gears against the inner wall surface of the accommodation in response to the difference in a rotational speed. This construction will ensure a generation of an initial torque by the above limited slip differential means even if the output shaft on one side spins to prevent the engagement reaction force from being induced.

On the contrary, the limited slip differential means serves to generate a transmission torque for pressing and biasing the first and second differential gears against the inner wall surface of the accommodation section of the differential gear case, whereas the limited slip differential torque is mainly derived from the frictional resistance force occurring between the first and second differential gears and the inner wall surface of the accommodation section, thereby ensuring an improved operative response and eliminating the necessity of setting the transmission torque of the limited slip differential means to a large value.

Thus, a differential gear unit can be provided which includes an improved limited slip differential superior in operative response and capable of generating a larger limited slip differential torque even when the engagement reaction force is not to be induced due to the spinning of the output wheel on one side.

While an illustrative and presently preferred embodiment of the present invention has been described in detail herein, it is to be understood that the inventive concepts may be otherwise variously embodied and employed and that the appended claims are intended to be construed to include such variations except insofar as limited by the prior art.

What is claimed is:

1. A differential gear unit comprising:

a differential gear case rotationally driven on an axis of coaxially extending first and second output shafts;

first and second driven gears rotatably received in said differential gear case in such a manner as to be coaxial with said axis said first and second driven gears being rotated integrally with said first and second output shafts respectively;

first and second differential gears adapted to engage with one of said first and second driven gears and rotatably supported within an accommodation section of said differential gear case so as to be partially engaged with each other, said first and second differential gears being circularly movable integrally with said differential gear case;

a first transmission member rotatably received in said differential gear case in such a manner as to be coaxial with said axis said first transmission member having an outer periphery provided with cam means engaged, in the direction of rotation, with said first and second differential gears, said cam means for pressing and biasing said first and second differential gears against an inner wall surface of said accommodation section; and a second transmission member being rotated integrally with said second output shaft and arranged relatively rotatably with respect to said first transmission member with an interposition of limited slip differential means for transmitting a torque in response to a difference in a rotational speed.

2. A differential gear unit according to claim 1, in which said cam means provided on said outer cylindrical surface of said first transmission member comprises a pair of grooves extending in a direction of the axis.

3. A differential gear unit according to claim 1, in which said limited slip differential means comprises:

- an annular housing having a substantially U-shaped longitudinal half section and acting as said first transmission member;
- a cylindrical hub arranged relatively rotatably with respect to said housing and acting as said second transmission member;
- an annular operative chamber defined by said annular housing and said cylindrical hub;
- a plurality of outer plates accommodated in said annular operative chamber, said outer plates being in spline engagement with an inner periphery of said housing and being spaced equally by spacer rings;
- a plurality of inner plates accommodated within said annular operative chamber, said inner plates being individually sandwiched by said outer plates and being in spline engagement with an outer periphery of said hub in such a manner that said inner plates are slidably movable in said direction of the axis; and
- a viscous fluid filled within said operative chamber.

4. A differential gear unit comprising:

- a differential gear case rotationally driven on an axis of coaxially extending first and second output shafts;
- first and second driven gears rotatably received in said differential gear case in such a manner as to be coaxial with said axis, said first and second driven gears being rotated integrally with said first and second output shafts, respectively;
- first and second differential gears adapted to engage with one of said first and second driven gears and rotatably supported within an accommodation section of said differential gear case so as to be partially engaged with each other, said first and second differential gears being circularly movable integrally with said differential gear case;
- a differential slip limiting means arranged within an interior of said differential gear case for inducing a differential slip limiting torque to press and bias said first and second differential gears against said differential gear case when a gripping force of drive wheel connected to one of said first and second output shafts with respect to a road surface has thoroughly resulted in zero;
- said differential slip limiting means comprises, a first transmission member rotatably received in said differential gear case in such a manner as to be coaxial with said axis, said first transmission member having an outer periphery provided with cam means engaged, in the direction of rotation, with said first and second differential gears, said cam means for pressing and biasing said first and second differential gears against an inner wall surface of said accommodation section; and
- a second transmission member rotated integrally with said second output shaft and arranged relatively rotatably with respect to said first transmission member for transmitting a torque in response to a difference in a rotational speed.

5. A differential gear unit according to claim 4, in which said differential slip limiting means comprises:

- an annular housing having a substantially U-shaped longitudinal half section and acting as said first transmission member;
- a cylindrical hub arranged relatively rotatably with respect to said housing and acting as said second transmission member;
- an annular operative chamber defined by said annular housing and said cylindrical hub;
- a plurality of outer plates accommodated in said annular operative chamber, said outer plates being in spline engagement with an inner periphery of said housing and being spaced equally by spacer rings;
- a plurality of inner plates accommodated within said annular operative chamber, said inner plates being individually sandwiched by said outer plates and being in spline engagement with an outer periphery of said hub in such a manner that said inner plates are slidably movable in said direction of the axis; and
- a viscous fluid filled within said operative chamber.

* * * * *

UNITED STATES PATENT AND TRADEMARK OFFICE
CERTIFICATE OF CORRECTION

PATENT NO. : 5,616,096
DATED : April 1, 1997
INVENTOR(S) : Makoto Hagiwara

It is certified that error appears in the above-indentified patent and that said Letters Patent is hereby corrected as shown below:

Column 2, Line 18, please delete "trait" and insert --- unit ---.
Column 3, Line 7, please delete "mad" and insert --- and ---.
Column 3, Line 54, please delete "t".
Column 3, Line 58, please delete "three" and insert --- force ---.
Column 4, Line 49, please delete "shall" and insert --- shaft ---.
Column 4, Line 63, please delete "shall" and insert --- shaft ---.
Column 5, Line 2, please delete "shall" and insert --- shaft ---.

Signed and Sealed this

Fourteenth Day of October, 1997

Attest:

BRUCE LEHMAN

*Attesting Officer*          Commissioner of Patents and Trademarks